(12) United States Patent
Yen et al.

(10) Patent No.: US 10,184,609 B2
(45) Date of Patent: Jan. 22, 2019

(54) KEY SUPPORTING STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, New Taipei (TW); Chia-Shiun Wu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/377,653

(22) Filed: Dec. 13, 2016

(65) Prior Publication Data
US 2017/0191612 A1    Jul. 6, 2017

(30) Foreign Application Priority Data

Dec. 31, 2015 (TW) .............................. 104144691 A

(51) Int. Cl.
| | |
|---|---|
| H01H 13/14 | (2006.01) |
| F16M 13/02 | (2006.01) |
| H01H 13/70 | (2006.01) |
| H01H 3/12 | (2006.01) |
| H01H 13/7065 | (2006.01) |
| G06F 3/02 | (2006.01) |

(52) U.S. Cl.
CPC ............... *F16M 13/02* (2013.01); *G06F 3/02* (2013.01); *H01H 3/125* (2013.01); *H01H 13/70* (2013.01); *H01H 13/7065* (2013.01); *F16M 2200/061* (2013.01); *H01H 2215/006* (2013.01); *H01H 2229/044* (2013.01)

(58) Field of Classification Search
CPC ....................................................... H01H 3/125
USPC ............... 248/421, 434, 439, 184.1; 200/344
See application file for complete search history.

(56) References Cited

U.S. PATENT DOCUMENTS

| | | | |
|---|---|---|---|
| 6,958,458 B1 * | 10/2005 | Tsai ........................ | H01H 3/125 200/344 |
| 7,238,908 B1 * | 7/2007 | Chen ....................... | H01H 3/125 200/344 |
| 8,957,337 B2 | 2/2015 | Niu | |

(Continued)

FOREIGN PATENT DOCUMENTS

CN              104576134 A        4/2015

*Primary Examiner* — Steven M Marsh
(74) *Attorney, Agent, or Firm* — Li & Cai Intellectual Property (USA) Office

(57) ABSTRACT

Disclosed is a key supporting structure. The key supporting structure includes a scissor-type component having a first supporting element and a second supporting element that are pivotally connected to each other. The first supporting element has a first frame, and two end of the first frame have at least one first pivot and at least one second pivot respectively. The second supporting element has a second frame, and two end of the second frame have at least one third pivot and at least one fourth pivot respectively. The first frame and the second frame are made from a powder sintered material. The first pivot, the second pivot, the third pivot, and the fourth pivot are formed on the first frame and the second frame by plastic injection molding method.

14 Claims, 5 Drawing Sheets

(56) References Cited

U.S. PATENT DOCUMENTS

| | | | |
|---|---|---|---|
| 9,455,096 B2 | 9/2016 | Chen | |
| 9,672,999 B1* | 6/2017 | Zou | H01H 13/14 |
| 2006/0145034 A1* | 7/2006 | Yen | B43M 99/00 |
| | | | 248/122.1 |
| 2010/0140071 A1* | 6/2010 | Wang | H01H 13/705 |
| | | | 200/344 |
| 2013/0220786 A1* | 8/2013 | Niu | H01H 3/125 |
| | | | 200/344 |
| 2014/0138223 A1* | 5/2014 | Jhuang | H01H 3/125 |
| | | | 200/344 |
| 2014/0138224 A1* | 5/2014 | Pan | H01H 13/7065 |
| | | | 200/344 |
| 2015/0101916 A1* | 4/2015 | Chen | H01H 3/125 |
| | | | 200/5 A |

* cited by examiner

KEY SUPPORTING STRUCTURE

TECHNICAL FIELD

The present disclosure relates to a key supporting structure, and more particularly to a key supporting structure adapted for thin keyboards.

BACKGROUND ART

With the increasing popularity of ultra-thin notebook computers and tablet computers, keyboards for these thin notebook computers and tablet computers also are continually evolving toward thinness.

In the structure of a thin keyboard, a scissor-type supporting mechanism (also referred to as a scissor) mostly is used as a supporting and positioning structure of a keycap of the keyboard. The keyboard structure using the scissor-type supporting mechanism generally comprises a base, a keycap, a scissor-type component, a resilient dome, and a conductive film. The scissor-type component is connected between the keycap and the base, for positioning the keycap above the base in a movable upward and downward manner.

A conventional scissor-type component mostly is manufactured from a POM resin material by injection molding. However, with the current trend of thin keyboards, the material thickness of the scissor-type component is reduced, and the use of the POM material in the fabrication of the scissor-type component will face the problem of insufficient structural strength, resulting in easy bending of the scissor-type component when the keycap is pressed, thus causing the tilting of the keycap and the situation of false key triggering.

In view of the above reasons, the conventional scissor-type component made of the POM resin material cannot meet the requirements of thin keyboards. Thus, how to improve the structural strength of the scissor-type component used for the thin keyboards by modifications in structural design such that it can be further thinned to meet the requirements of reduced size of parts for ultra-thin keyboards while improving stability has become one of major issues to be solved in the art.

SUMMARY OF THE PRESENT INVENTION

A primary object of the present disclosure is to provide a key supporting structure adopting a composite structure, which can overcome the disadvantages of poor structural strength and failure to be thinned of a conventional scissor-type component made of a plastic and also can solve the problems of a scissor-type structure made of a metal material.

One embodiment of the present disclosure provides a key supporting structure mounted between a keycap and a base. The key supporting structure comprises a scissor-type component, which has a first supporting element and a second supporting element that are pivotally connected to each other. The first supporting element has a first frame, and two ends of the first frame have at least one first pivot and at least one second pivot respectively. The second supporting element has a second frame, and two ends of the second frame have at least one third pivot and at least one fourth pivot respectively. The first frame and the second frame are made from a powder sintered material. The at least one first pivot and the at least one second pivot, and the at least one third pivot and the at least one fourth pivot are formed from a plastic material by injection molding on the first frame and the second frame.

In one preferred embodiment of the present disclosure, one of the first frame and the second frame is provided with a shaft hole, and the other of the first frame and the second frame is provided with a protruding shaft. The protruding shaft is engaged in the shaft hole such that the first frame and the second frame are pivotally connected to each other. The protruding shaft and the shaft hole are formed from the plastic material by injection molding on the first frame and the second frame.

In one preferred embodiment of the present disclosure, the first supporting element and the second supporting element are formed by firstly forming the first frame and the second frame from a powder sintering molding material, then putting the first frame and the second frame into a plastic injection molding die, and forming the at least one first pivot, second pivot, third pivot, fourth pivot, the shaft hole, and the protruding shaft on the first frame and the second frame.

In one preferred embodiment of the present disclosure, the powder sintered material is a metal powder sintered material or a ceramic powder sintered material.

The advantageous effect of the present disclosure is that the scissor-type structure preserves good strength and hardness with a reduced thickness and size, and is not easily bendable, thus meeting the requirements of thinned keyboards. Also, the scissor-type component preserves the properties of a plastic material, resulting in reduced collision noise, reduced friction, and wear resistance in operation.

In order to further understand the features and technical content of the present disclosure, reference can be made to the detailed description and accompanying drawings of the present disclosure. However, the accompanying drawings are only provided for reference and illustration, but not intended to limit the present disclosure.

DETAILED DESCRIPTION OF THE PREFERRED EMBODIMENTS

Figure 1:
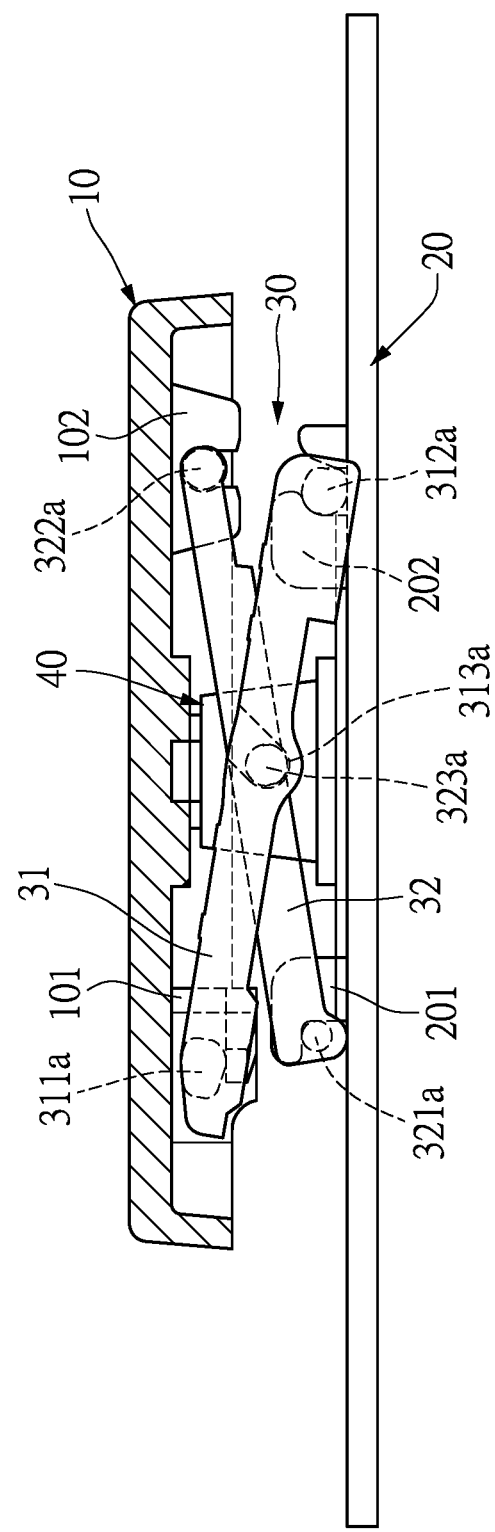
FIG. 1 is a cross-sectional view of assembly of a key supporting structure of the present disclosure.
Figure 2:
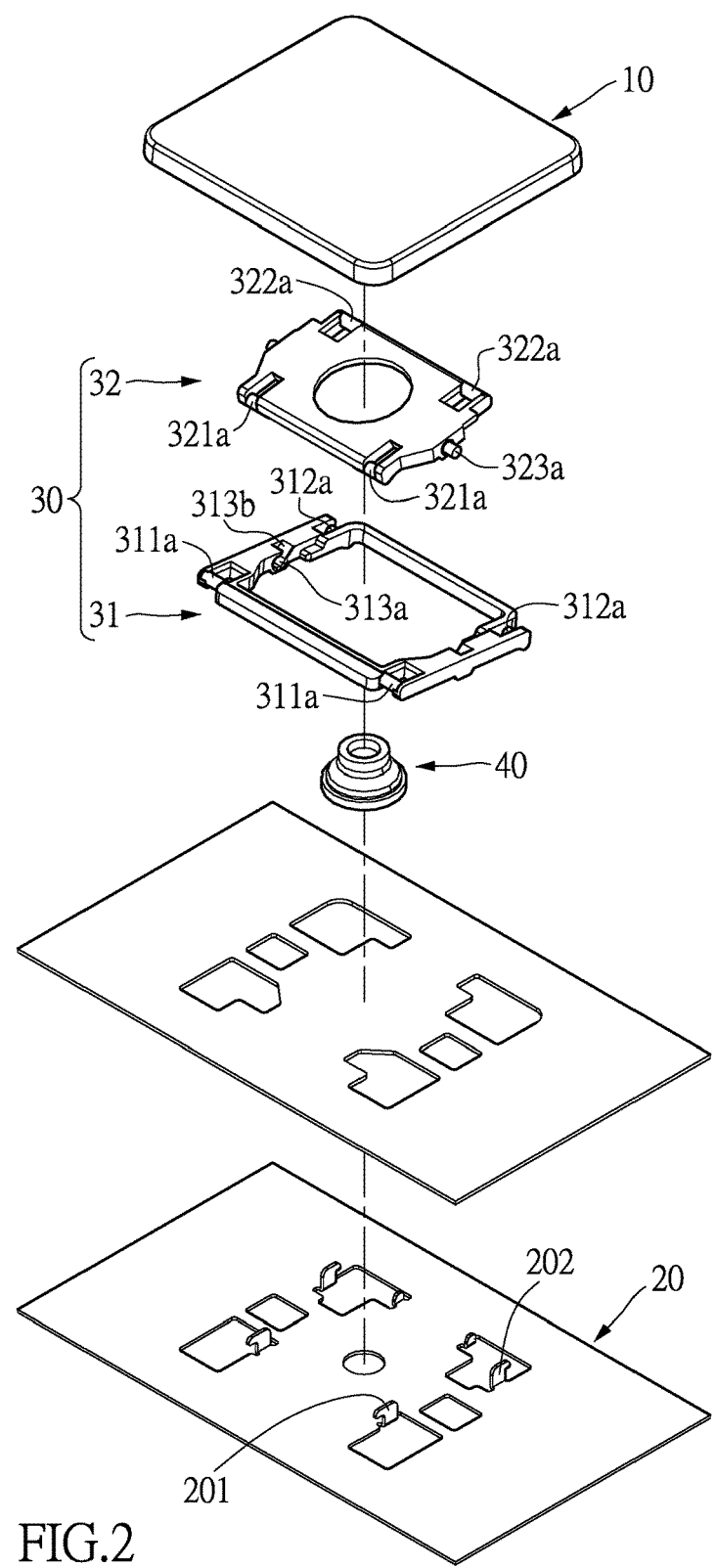
FIG. 2 is an exploded view of a key supporting structure of the present disclosure.

The present disclosure provides a key supporting structure. As shown in FIG. 1 and FIG. 2, the key supporting structure comprises a scissor-type component 30, and the scissor-type component 30 is connected between a base 20 of a keyboard and a keycap 10, for positioning the keycap 10 in such a manner that it can move upward and downward along a path perpendicular to a top surface of the base 20. A resilient dome 40 is also disposed between the keycap 10 and the base 20. The resilient dome 40 will contact with a conductive thin film (not shown) of the keyboard module when the keycap 10 is pressed downward to a certain depth, to generate a pressing signal.

Two sides of a bottom surface of the keycap 10 are provided with a first limiting portion 101 and a second limiting portion 102 respectively. The top surface of the base 20 is provided with a third limiting portion 201 and a fourth limiting portion 202 respectively at positions corresponding to the first limiting portion 101 and the second limiting portion 102 of the keycap 10.

Figure 3:
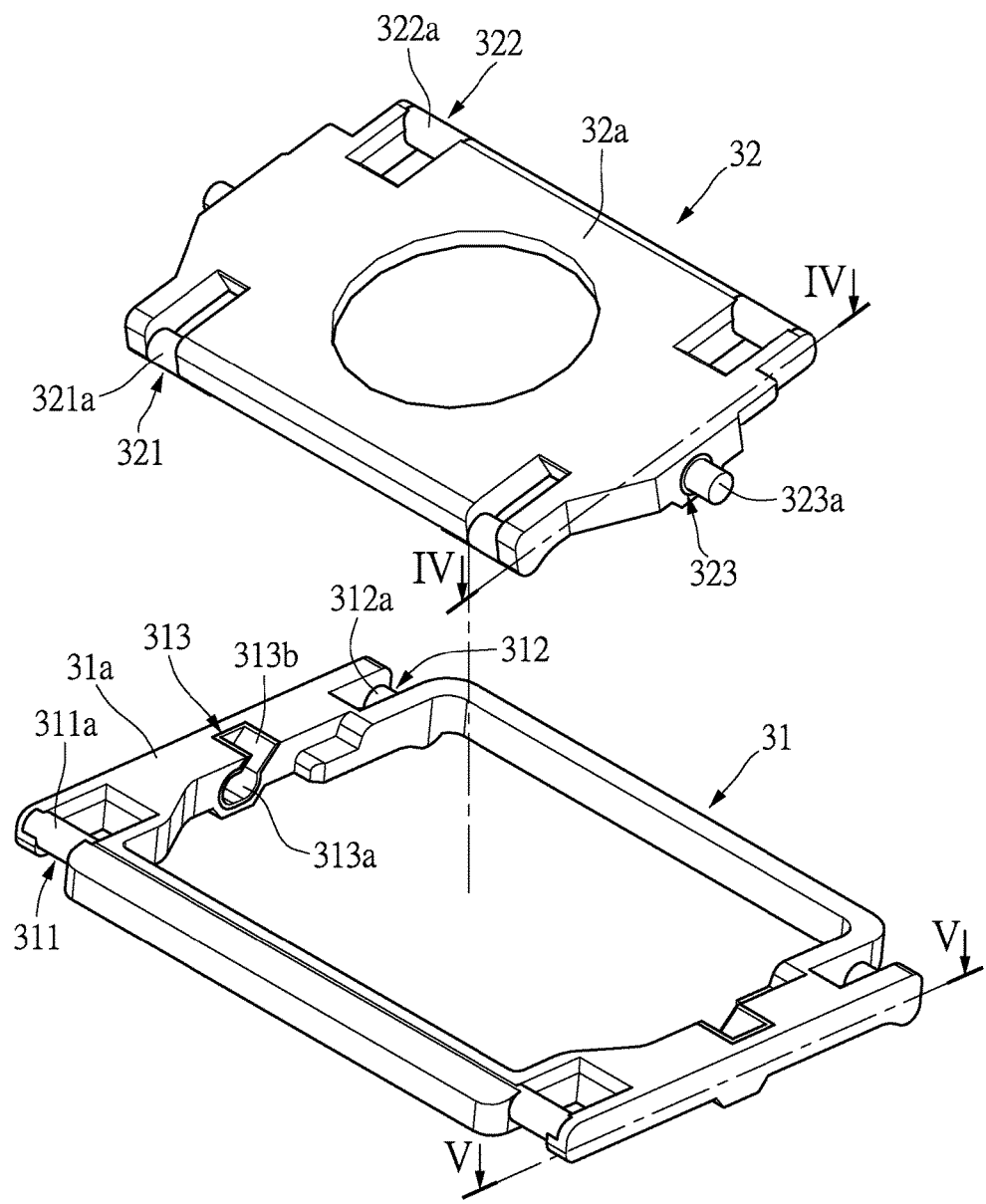
FIG. 3 is an enlarged perspective view of a first supporting element and a second supporting element of a scissor-type component used in the present disclosure.

As shown in FIG. 3, the scissor-type component 30 has a first supporting element 31 and a second supporting element 32. In the embodiment, the first supporting element 31 has a first frame 31a composed of two generally parallel crossbars and two generally parallel side bars. The second supporting element 32 has a second frame 32a that is embedded within the first frame 31a of the first supporting element 31, and two ends of the first frame 31a and the second frame 32a are pivotally connected to each other.

Figure 4:
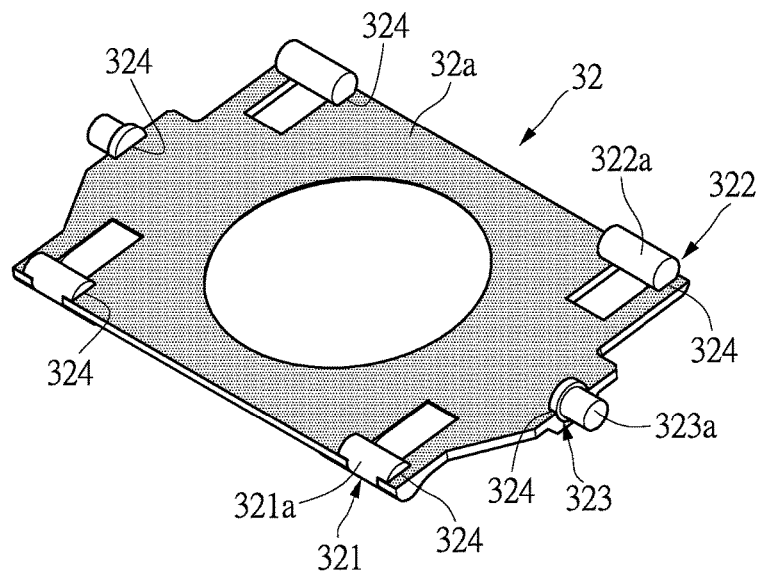
FIG. 4 is a cross-sectional perspective view of the second supporting element of the scissor-type component used in the present disclosure.

As shown in FIG. 3 and FIG. 4, two ends of the first frame 31a of the first supporting element 31 of the present disclosure have two first pivots 311a and two second pivots 312a respectively. The first pivots 311a and the second pivots 312a are formed from a plastic material, and the first pivots 311a and the second pivots 312a are respectively formed on two first plastic formed portions 311 and two second plastic formed portions 312 that are disposed at the two ends of the first frame 31a respectively.

As shown in FIG. 3 and FIG. 4, the second frame 32a of the second supporting element 32 is provided with two third pivots 321a at one side corresponding to the first pivots 311a, and two fourth pivots 322a at one side corresponding to the second pivots 312a. The two third pivots 321a are formed on two third plastic formed portions 321 respectively, and the two fourth pivots 322a are formed on two fourth plastic formed portions 322 respectively. It is to be noted herein that the numbers of the first pivots 311a and the first plastic formed portions 311 and also the second pivots 312a and the second plastic formed portions 312 of the first supporting element 31 are not limited to the numbers disclosed in the embodiment, and may be one or any number of more than one in other embodiments. Similarly, the numbers of the two third plastic formed portions 321 and the third pivots 321a and also the fourth plastic formed portions 322 and the fourth pivots 322a of the second supporting element 32 are not limited to the numbers disclosed in the embodiment.

Two sides of the first frame 31a of the first supporting element 31 are respectively provided with a first pivot portion 313 between the first plastic formed portions 311 and the second plastic formed portions 312. A second pivot portion 323 is disposed on two sides of the second frame 32a of the second supporting element 32 respectively between the third plastic formed portions 321 and the fourth plastic formed portions 322 and adjacent to the two first pivot portions 313. In the embodiment, the two first pivot portions 313 are provided with a shaft hole 313a respectively, while the two second pivot portions 323 are provided with a protruding shaft 323a respectively. The engagement of the two protruding shafts 323a in the two shaft holes 313a enables the first supporting element 31 and the second supporting element 32 to be pivotally connected to each other. In the embodiment, the sides of the first frame 31a at which the shaft holes 313a are located are further provided with a notched portion 313b, for the two protruding shafts 323a to be engaged in the two shaft holes 313a from the notched portions 313b, facilitating assembly operation of the first supporting element 31 and the second supporting element 32.

It is to be noted herein that the positions of the shaft holes 313a and the protruding shafts 323a can be interchanged, namely, in other embodiments, the shaft holes 313a can be instead disposed on the second pivot portions 323 of the second supporting element 32, while the protruding shafts 323a can be instead disposed on the two first pivot portions 313 of the first supporting element 31.

As shown in FIG. 1, in the embodiment, when the scissor-type component 30 is assembled between the keycap 10 and the base 20, the first supporting element 31 and the second supporting element 32 are connected between the keycap 10 and the base 20 in an "X"-cross pattern. The first pivots 311a of the first supporting element 31 are slidably connected to the first limiting portion 101 at the bottom surface of the keycap 10, and the second pivots 312a of the first supporting element 31 are pivotally connected to the fourth limiting portion 202 at the top surface of the base 20. The third pivots 321a of the second supporting element 32 are slidably connected to the third limiting portion 201 at the surface of the base 20, and the fourth pivots 322a are pivotally connected to the second limiting portion 102 at the bottom of the keycap 10.

Through the assembly above, when viewing from the direction as shown in FIG. 1, the second pivots 312a at the right end of the first supporting element 31 are pivotally positioned at the top surface of the base 20 while the fourth pivots 322a at the right end of the second supporting element 32 are pivotally positioned at the bottom of the keycap 10, and also the first pivots 311a at the left side of the first supporting element 31 can laterally slide along the bottom surface of the keycap 10 while the third pivots 321a at the left side of the second supporting element 32 can laterally slide along the top surface of the base 20. In addition, the first supporting element 31 and the second supporting element 32 are pivotally connected to each other at the middle. Thus, when the first supporting element 31 and the second supporting element 32 are driven by upward and downward displacement of the keycap 10, the right ends of the first supporting element 31 and the second supporting element 32 rotate about the second pivots 312a and the fourth pivots 322a and are limited to upward and downward displacement in one direction perpendicular to the top surface of the base 20, while the first pivots 311a and the third pivots 321a at the left ends of the first supporting element 31 and the second supporting element 32 will slide in one direction parallel to the bottom surface of the keycap 10 or the top surface of the base 20. During ascending or descending of the keycap 10, the first pivots 311a and the fourth pivots 322a of the first supporting element 31 and the second supporting element 32 that are connected to the bottom of the keycap 10 are maintained in a horizontal state, so the keycap 10 can be limited and directed to displace upward and downward along the path perpendicular to the base 20 and the keycap 10 is maintained in a horizontal state during the upward and downward displacement.

The scissor-type component 30 of the present disclosure is characterized in that the first frame 31a and the second frame 32a of the first supporting element 31 and the second supporting element 32 are made from a powder sintered material by powder sintering molding technique (including powder molding process and powder injection molding process). The pivots 311a, 312a, 321a, 322a, the shaft holes 313a, the protruding shafts 323a, the plastic formed portions 311, 312, 321, 322, the first pivot portions 313, and the second pivot portions 323 are formed on the first frame 31a and the second frame 32a from an engineering plastic material by injection molding technique. Thus, the first supporting element 31 and the second supporting element 32 form a composite structure combining the powder sintered material and the plastic.

Figure 5:
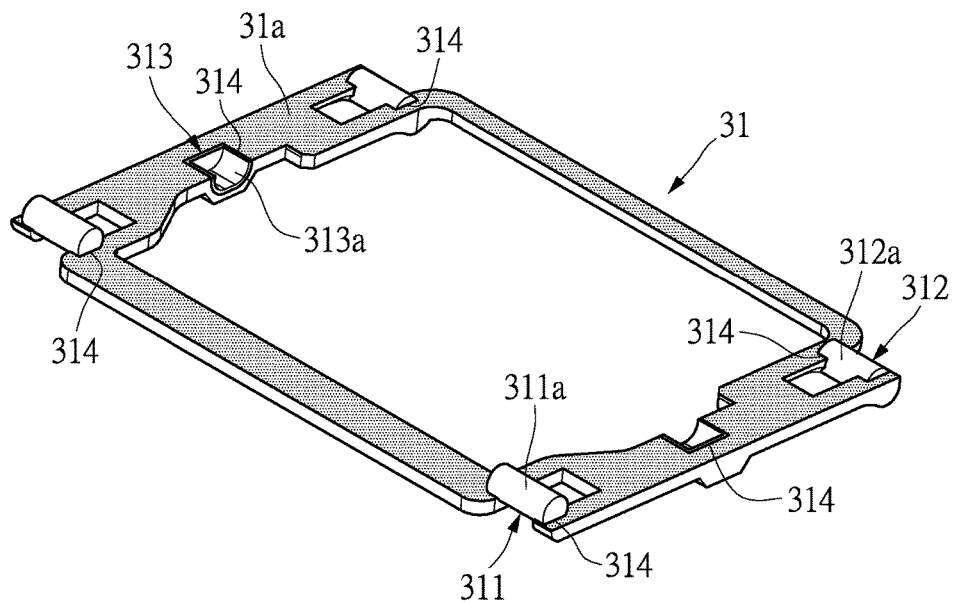
FIG. 5 is a cross-sectional perspective view of the first supporting element of the scissor-type component used in the present disclosure.

As shown in FIG. 4 and FIG. 5, in order to avoid the circumstance that different materials cannot be bonded to each other in the first supporting element 31 and the second supporting element 32, in the present disclosure, a plurality of depressions 314 are disposed at junctions between the first frame 31a and the first plastic formed portions 311, the second plastic formed portions 312, the first pivot portions 313 respectively, and a plurality of depressions 324 are disposed at junctions between the second frame 32a and the third plastic formed portions 321, the fourth plastic formed portions 322 and the second pivot portions 323, respectively, such that after being formed, the plastic formed portions 311, 312, 321, 322, the first pivot portions 313, and the second pivot portions 323 are partially engaged in the plurality of depressions 314,324 of the first frame 31a and the second frame 32a, or are covered by the materials of the first frame 31a and the second frame 32a, thereby improving the bonding force of the materials.

The first supporting element 31 and the second supporting element 32 of the scissor-type component 30 of the present disclosure can have the following characteristics due to the composite structure above. Firstly, in the manufacture of the first frame 31a and the second frame 32a, a powder sintered material having high strength and hardness and having suitable toughness can be selected, so with reduced size and material thickness, the first frame 31a and the second frame 32a still can preserve good mechanical strength, and are less prone to breakage and not easily bendable in compression, such that the scissor-type component of the present disclosure can meet the requirements of ultra-thin keyboards and can provide rather stable support for the keycap 10.

Also, the first pivots 311a, the second pivots 312a, the third pivots 321a, the fourth pivots 322a, the protruding shafts 323a, and the shaft holes 313a of the first supporting element 31 and the second supporting element 32 are formed from a plastic material by plastic injection molding process according to the present disclosure, such that the pivots 311a, 312a, 321a, 322a, the protruding shafts 323a, and the shaft holes 313a have the properties of elastic deformability, low friction, and wear resistance. Thus, although the body structure of the first supporting element 31 and the second supporting element 32 of the scissor-type component 30 is a rigid structure made of a powder sintered material, the pivots 311a, 312a, 321a, 322a that are configured to be connected to the limiting portions 101, 102, 201, 202 of the keycap 10 and the base 20, and the shaft holes 313a and the protruding shafts 323a of the first supporting element 31 and the second supporting element 32 that are pivotally connected to each other still preserve the properties of a plastic material, such that the first supporting element 31 and the second supporting element 32 can have reduced collision noise of parts, reduced friction resistance and wear resistance in operation.

In addition, as shown in FIG. 1, in the key structure of the present disclosure, the limiting portions 101, 102, 201, 202 of the keycap 10 and the base 20 have an opening respectively for the pivots 311a, 312a, 321a, 322a of the first supporting element 31 and the second supporting element 32 to be engaged therein, and the width at the openings of the limiting portions 101, 102, 201, 202 is designed to be slightly less than the diameter of the pivots 311a, 312a, 321a, 322a, and the width at openings of the notched portions 313b of the shaft holes 313a is designed to be slightly less than the diameter of the protruding shafts 323a, such that micro-interferences are created when the pivots 311a, 312a, 321a, 322a and the protruding shafts 323a are engaged in the openings of the limiting portions 101, 102, 201, 202, and the notched portions 313b of the shaft holes 313a, whereby after the first supporting element 31 and the second supporting element 32 and the keycap 10 and the base 20 are assembled, the pivots 311a, 312a, 321a, 322a and the protruding shafts 323a are not easily disengaged from the limiting portions 101, 102, 201, 202 and the shaft holes 313a. Since the pivots 311a, 312a, 321a, 322a, the protruding shafts 323a, and the shaft holes 313a are formed from a plastic material in the present disclosure, they have the margin of elastic deformability and can mate with the limiting portions of the keycap 10 and the base 20 by micro-interference fits, and the protruding shafts 323a and the shaft holes 313a are easily engaged with each other.

The powder sintered material adopted for the first frame 31a and the second frame 32a, and the plastic materials adopted for the plastic formed portions 311, 312, 321, 322, the first pivot portions 313, the second pivot portions 323, the pivots 311a, 312a, 321a, 322a, the protruding shafts 323a, and the shaft holes 313a in the present disclosure are further illustrated below.

Because they serve as the body structure for the first supporting element 31 and the second supporting element 32, the first frame 31a and the second frame 32a of the present disclosure must be fabricated from a powder sintered material suitable for fabricating a structural component or a tool. The selected materials must have good mechanical strength and hardness such that they are less likely to be deformed by bending, and are required to have suitable toughness such that final products are less prone to breakage, and are required to have good processability such that they can be made into fine parts of complex shape.

The powder sintered material that may be selected in the present disclosure generally may be divided into two main types: a metal powder sintered material or a ceramic powder sintered material. When the metal powder sintered material is selected as the powder sintered material, a metal powder sintered material commonly used for a metal structural part or a tool may be selected, and may be a single metal material or a mixture of metal powder materials, for example: tungsten carbide, titanium alloy, iron alloy (e.g. iron-nickel alloy), stainless steel (e.g. 304L, 306, 440C, 17-4PH stainless steel) powders, various alloy steels (e.g. SKD11 die steel, HSS-PM, etc.), and copper alloy powder materials.

When a ceramic powder sintered material is selected as the powder sintered material, a ceramic powder sintered material commonly used for a structural component or a tool may be selected, for example: zirconium oxide ($ZrO_2$), yttrium oxide ($Y_2O_3$), aluminum oxide ($Al_2O_3$), silicon nitride ($Si_3N_4$), silicon carbide (SiC), and boron nitride (BN), and so on.

Engineering plastics having good mechanical strength, low friction coefficient, and better wear resistance may be selected as the plastic materials of the plastic formed portions 311, 312, 321, 322, the first pivot portions 313, and the second pivot portions 323 of the first supporting element 31 and the second supporting element 32, for example: vinyl chloride (PVC), polyethylene (HDPE), ethylene steel (UPE), Teflon (PVDF), polyester (Polyester), polyethylene terephthalate (PET), polypropylene (PP), nylon 6 (Nylon-6), nylon 66 (Nylon-66), plastic steel (POM), ABS, polystyrene (PS), acrylic (PMMA), polycarbonate (PC), and so on.

The manufacturing method of the scissor-type component 30 of the present disclosure is further described below. The first supporting element 31 and the second supporting element 32 of the scissor-type component 30 of the present disclosure are a composite structure combining the powder sintered material and the plastic material, and thus the manufacturing procedure thereof generally is: firstly forming the first frame 31a and the second frame 32a from the powder sintered material, and then putting the first frame 31a and the second frame 32a into a plastic injection die for molding the plastic formed portions 311, 312, 321, 322, the first pivot portions 313, and the second pivot portions 323 by in-mold insert injection molding, and then forming the plastic formed portions 311, 312, 321, 322, the first pivot portions 313, and the second pivot portions 323, along with the plurality of pivots, the protruding shafts, and the shaft holes on the first frame 31a and the second frame 32a of the first supporting element 31 and the second supporting element 32 by plastic injection molding.

The powder sintering molding process adopted in the present disclosure may further be divided into powder molding and powder injection molding. Powder injection molding is one of the powder molding techniques and differs from the usual powder molding in that the powder injection molding adopts finer powder particles, with addition of a polymeric binding agent for improving the powder flowability in the powder particles, and the molding of the powders is performed by a metal injection molding machine and a die similar to those in plastic injection molding.

Figure 6:
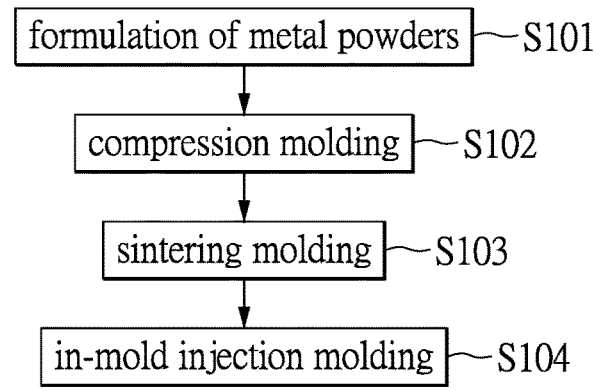
FIG. 6 is a process flow of manufacturing a first supporting element and a second supporting element of a scissor-type component using a powder molding process according to the present disclosure.

As shown in FIG. 6 (please also refer to FIG. 2, FIG. 4, and FIG. 5), a schematic view of the process flow of fabricating the first supporting element 31 and the second supporting element 32 by powder molding technique according to the present disclosure is shown. The manufacturing procedure thereof generally comprises:

Step S101: formulation of metal powders, in which a ceramic or metal powder material intended for forming the first supporting element and the second supporting element is mixed with other powder materials to be added into a powder sintered material.

Step S102: compression molding, in which the powder sintered material is put into a molding die, and the powder sintered material in the die is compression molded by pressurization to form a green body.

Step S103: sintering molding, in which the green body is sintered at a high temperature to form the first frame 31a and the second frame 32a of the first supporting element 31 and the second supporting element 32.

Step S104: in-mold injection molding, in which the first frame 31a and the second frame 32a that are sintering molded are put into the injection molding die, and then the plastic formed portions 311, 312, 321, 322, the first pivot portions 313, and the second pivot portions 323 are formed on the first frame 31a and the second frame 32a of the first supporting element 31 and the second supporting element 32 by injection molding.

Figure 7:
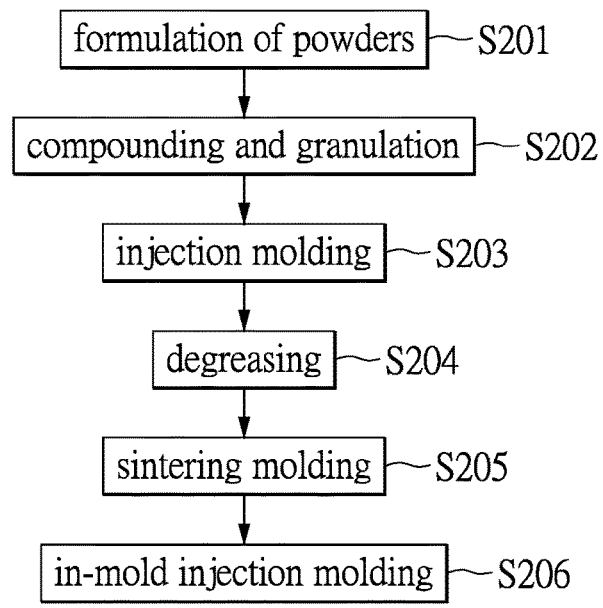
FIG. 7 is a process flow of manufacturing a first supporting element and a second supporting element of a scissor-type component using a powder injection molding process according to the present disclosure.

As shown in FIG. 7 (please also refer to FIG. 2, FIG. 4, and FIG. 5), a schematic view of the process flow of fabricating the first supporting element 31 and the second supporting element 32 by injection molding technique according to the present disclosure is shown. The manufacturing procedure thereof generally comprises:

Step S201: formulation of powders, in which a ceramic or metal powder material intended for forming the first supporting element and the second supporting element is mixed with other powder materials to be added and a polymeric binding agent for improving the flowability of the powder into a powder sintered material.

Step S202: compounding and granulation, in which after being mixed, the powder sintered material is subjected to compounding, pulverizing, and granulation and the like, to produce a granular material for injection molding.

Step S203: injection molding, in which the granular material is molded in the die by pressurization by the metal injection molding machine and the die, to form a green body of the first frame 31a and the second frame 32a of the first supporting element 31 and the second supporting element 32.

Step S204: degreasing, in which the binding agent in the green body of the first frame 31a and the second frame 32a is removed by a solvent and a degreasing furnace.

Step S205: sintering molding, in which the green body of the first frame 31a and the second frame 32a is sintered at a high temperature to form the first frame 31a and the second frame 32a of the first supporting element 31 and the second supporting element 32.

Step S206: in-mold injection molding, in which the first frame 31a and the second frame 32a that are sintering molded are put into the injection molding die, and then the plastic formed portions 311, 312, 321, 322, the first pivot portions 313, and the second pivot portions 323 are formed on the first frame 31a and the second frame 32a of the first supporting element 31 and the second supporting element 32 by injection molding.

[Possible Effects of the Embodiments]

In sum, because the scissor-type component employed in the key supporting structure of the present disclosure is a composite structure composed of different materials, the advantages of the two materials can be combined, so that the first supporting element 31 and the second supporting element 32 of the scissor-type component 30 preserve a high strength with a reduced material thickness and are less likely to be deformed by bending, thus facilitating miniaturization in size of the scissor-type component and improving its supporting stability. Thus, the key supporting structure of the present disclosure is particularly suitable for ultra-thin keyboards. On the other hand, the pivots 311a, 312a, 321a, 322a, the protruding shafts 323a, and the shaft holes 313a in the scissor-type component 30 of the present disclosure that are configured to contact with the keycap 10 and the base 20 can be fabricated from a suitable engineering plastic material, such that they have a better coefficient of resilience and can be assembled by micro-interference fit. In addition, because the plastic material has the properties of good buffer capacity, low friction, and wear resistance, the scissor-type component of the present disclosure also can have the same properties of low noise, less resistance, and abrasion resistance as a scissor-type component made of a plastic material.

The description above is only preferred embodiments of the present disclosure and is not intended to limit the scope of the present disclosure. All equivalents with technical changes made according to the specification and drawings of the present disclosure should fall within the scope of the present disclosure.

What is claimed is:

1. A key supporting structure mounted between a keycap and a base, comprising:

a scissor-type component, having a first supporting element and a second supporting element, the first supporting element and the second supporting element being pivotally connected to each other; the first supporting element having a first frame, two ends of the first frame having at least one first pivot and at least one second pivot respectively, the second supporting element having a second frame, and two ends of the second frame having at least one third pivot and at least one fourth pivot respectively;

wherein the first frame and the second frame are made of a metal powder sintered material so as to provide a first sintered metal structural frame and a second sintered metal structural frame, wherein the at least one first pivot, the at least one second pivot, the at least one third pivot and the at least one fourth pivot are made of a plastic material by injection molding, the at least one first pivot and the at least one second pivot are joined to the first sintered metal structural frame, and the at least one third pivot and the at least one fourth pivot are joined to the second sintered metal structural frame;

wherein two sides of the first frame are respectively formed with a first pivot portion, and each of the first pivot portion has a shaft hole and a notched portion, the shaft hole being opened on an inner surface of the first frame, the notched portion spacely communicated with the shaft hole and being opened on an outer surface of the first frame; wherein two sides of the second frame respectively have a second pivot portion, and each of the second pivot portions has a protruding shaft, and the protruding shaft being rotatably engaged in the shaft hole through the notched portion;

wherein a width at an opening of the notched portion is smaller than a diameter of the protruding shaft, and the protruding shaft has the property of elastic deformability.

2. The key supporting structure of claim 1, wherein the protruding shaft and the shaft hole are made of the plastic material by injection molding on the first frame and the second frame.

3. The key supporting structure of claim 2, wherein the two ends of the first frame have at least one first plastic formed portion and at least one second plastic formed portion respectively, the at least one first pivot being formed on the at least one first plastic formed portion, the at least one second pivot being formed on the at least one second plastic formed portion; the two ends of the second frame have at least one third plastic formed portion and at least one fourth plastic formed portion respectively, the at least one third pivot being formed on the at least one third plastic formed portion, and the at least one fourth pivot being formed on the at least one fourth plastic formed portion.

4. The key supporting structure of claim 3, wherein the at least one first pivot portion is disposed on the first frame between the at least one first plastic formed portion and the at least one second plastic formed portion, and the at least one second pivot portion is disposed on the second frame between the at least one third plastic formed portion and the at least one fourth plastic formed portion and adjacent to the at least one first pivot portion, the shaft hole and the protruding shaft being disposed on the at least one first pivot portion and the at least one second pivot portion respectively.

5. The key supporting structure of claim 4, wherein a plurality of depressions are disposed at connections of the first frame to the at least one first plastic formed portion, the at least one second plastic formed portion, the at least one first pivot portion and at connections of the second frame to the at least one third plastic formed portion, the at least one fourth plastic formed portion, the at least one second pivot portion, respectively, the at least one first plastic formed portion, the at least one second plastic formed portion, the at least one third plastic formed portion, the at least one fourth plastic formed portion, the at least one first pivot portion, and the at least one second pivot portion being partially engaged in the plurality of depressions, respectively.

6. The key supporting structure of claim 5, wherein the first frame of the first supporting element and the second frame of the second supporting element are put into a plastic injection molding die, and the at least one first plastic formed portion and the second plastic formed portion, the at least one third plastic formed portion and the at least one fourth plastic formed portion, and the at least one first pivot portion and the second pivot portion are formed on the first frame and the second frame.

7. The key supporting structure of claim 1, wherein the metal powder sintered material is selected from one of tungsten carbide, titanium alloy, iron alloy materials, stainless steel materials, alloy steel materials, and copper alloy materials, or a combination thereof.

8. The key supporting structure of claim 2, wherein the plastic material is selected from one of vinyl chloride, polyethylene, ethylene steel, Teflon, polyester, polyethylene terephthalate, polypropylene, nylon 6, nylon 66, plastic steel, ABS, polystyrene, acrylic, and polycarbonate, or a combination thereof.

9. A method for manufacturing a key supporting structure, which is mounted between a keycap and a base, comprising the steps of:

forming a first frame of a first supporting element, and a second frame of a second supporting element, wherein the first frame and the second frame are made of a metal powder sintered material so as to provide a first sintered metal structural frame and a second sintered metal structural frame; wherein two sides of the first frame are respectively formed with a first pivot portion, and each of the first pivot portion has a shaft hole and a notched portion; the shaft hole being opened on an inner surface of the first frame, the notched portion spacely communicated with the shaft hole and being opened on an outer surface of the first frame, wherein two sides of the second frame respectively have a second pivot portion, and each of the second pivot portion has a protruding shaft; wherein a width at an opening of the notched portion is smaller than a diameter of the protruding shaft, and the protruding shaft has the property of elastic deformability;

forming at least one first pivot and at least one second pivot both made of a plastic material by injection molding and joining concurrently to two ends of the first sintered metal structural frame, respectively;

forming at least one third pivot and at least one fourth pivot made of a plastic material by injection molding and joining concurrently to two ends of the second sintered metal structural frame, respectively; and assembling the second supporting element with the first supporting element to form a scissor-type component, wherein the protruding shaft is rotatably engaged in the shaft hole through the notched portion.

10. The method for manufacturing the key supporting structure of claim 9, wherein the protruding shaft and the shaft hole are made of the plastic material by injection molding on the first frame and the second frame.

11. The method for manufacturing the key supporting structure of claim 10, wherein the two ends of the first frame have at least one first plastic formed portion and at least one second plastic formed portion respectively, the at least one first pivot is formed on the at least one first plastic formed portion, the at least one second pivot is formed on the at least one second plastic formed portion; the two ends of the second frame have at least one third plastic formed portion and at least one fourth plastic formed portion respectively, the at least one third pivot is formed on the at least one third plastic formed portion, and the at least one fourth pivot is formed on the at least one fourth plastic formed portion.

12. The method for manufacturing the key supporting structure of claim 11, wherein the at least one first pivot portion is disposed on the first frame between the at least one first plastic formed portion and the at least one second plastic formed portion, and the at least one second pivot portion is disposed on the second frame between the at least one third plastic formed portion and the at least one fourth plastic formed portion and adjacent to the at least one first pivot portion, the shaft hole and the protruding shaft are disposed on the at least one first pivot portion and the at least one second pivot portion respectively.

13. The method for manufacturing the key supporting structure of claim 12, wherein a plurality of depressions are disposed at connections of the first frame to the at least one first plastic formed portion, the at least one second plastic formed portion, and the at least one first pivot portion and at connections of the second frame to the at least one third plastic formed portion, the at least one fourth plastic formed portion, and the at least one second pivot portion, respectively, the at least one first plastic formed portion, the at least one second plastic formed portion, the at least one third plastic formed portion, the at least one fourth plastic formed portion, the at least one first pivot portion, and the at least one second pivot portion are partially engaged in the plurality of depressions, respectively.

14. The method for manufacturing the key supporting structure of claim 13, wherein the first frame of the first supporting element and the second frame of the second supporting element are put into a plastic injection molding die, and the at least one first plastic formed portion, the second plastic formed portion, the at least one third plastic formed portion, the fourth plastic formed portion, the at least one first pivot portion and the at least one second pivot portion are formed on the first frame and the second frame.

\* \* \* \* \*